Dec. 11, 1951  E. BERLANT  2,578,037
MICROFILM CAMERA
Filed May 17, 1947  5 Sheets-Sheet 1

EMMANUEL BERLANT,
INVENTOR.
BY W. E. Bratt
ATTORNEY.

Dec. 11, 1951          E. BERLANT          2,578,037
                      MICROFILM CAMERA

Filed May 17, 1947                    5 Sheets-Sheet 2

EMMANUEL BERLANT,
       INVENTOR.

BY W. E. Beatty

ATTORNEY.

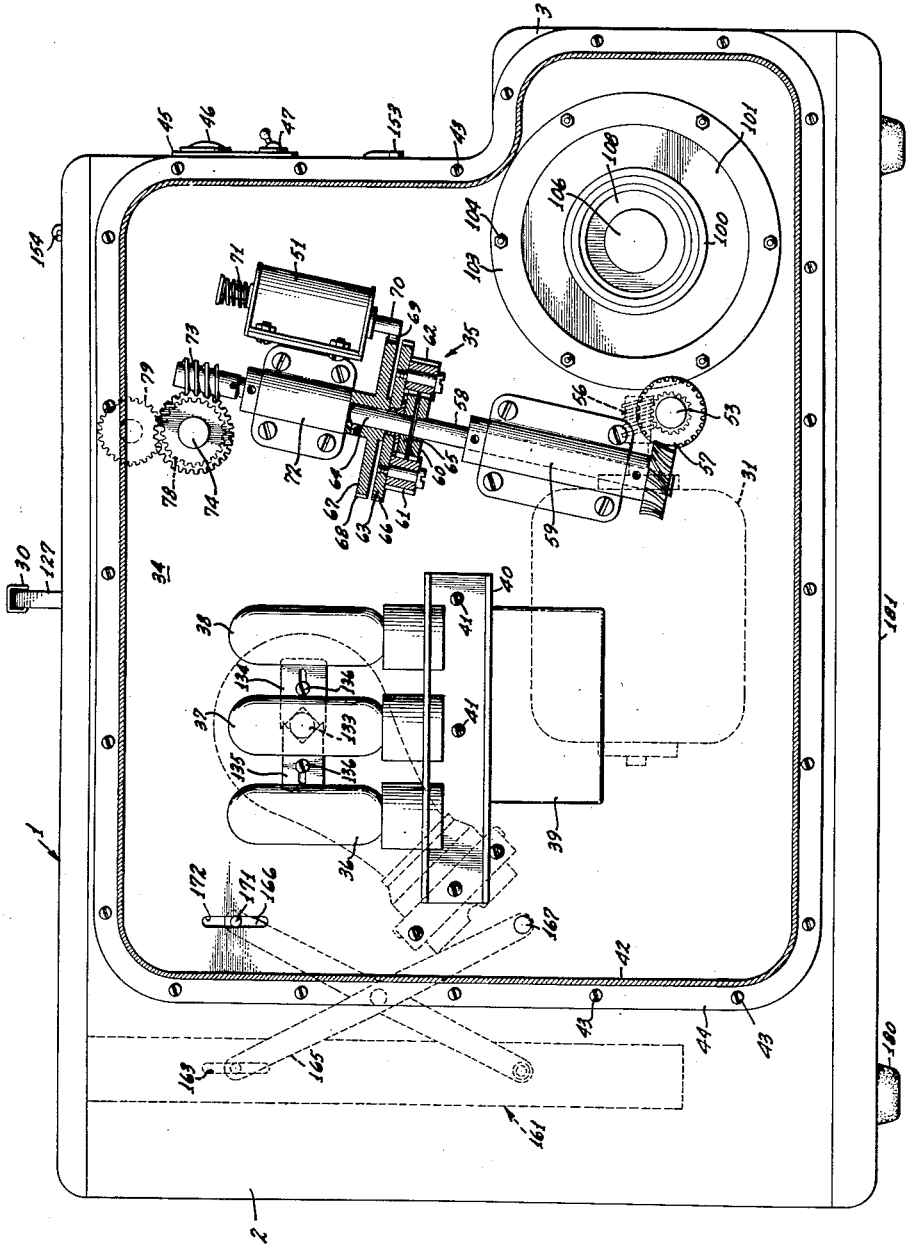

Dec. 11, 1951 E. BERLANT 2,578,037
MICROFILM CAMERA
Filed May 17, 1947 5 Sheets-Sheet 4
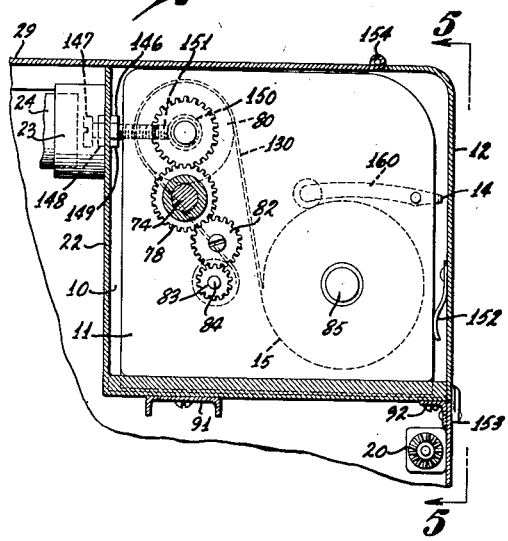
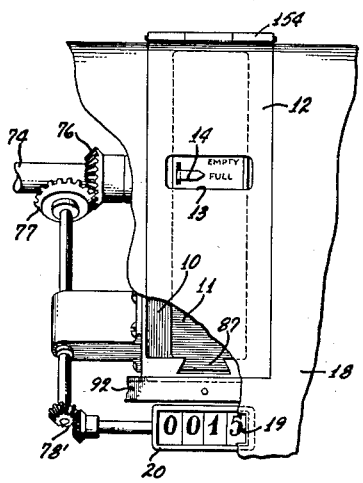
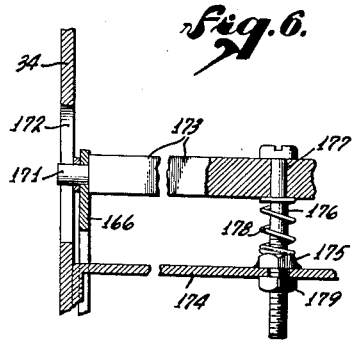
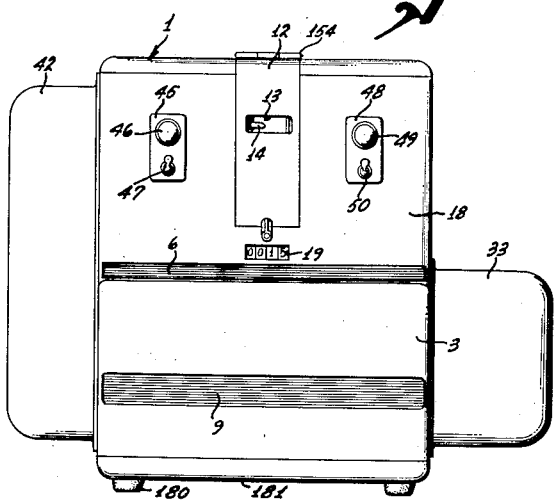
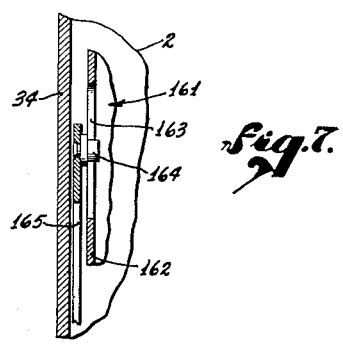
EMMANUEL BERLANT,
INVENTOR.
BY *W U Beatty*
ATTORNEY.

Dec. 11, 1951  E. BERLANT  2,578,037
MICROFILM CAMERA
Filed May 17, 1947  5 Sheets-Sheet 5
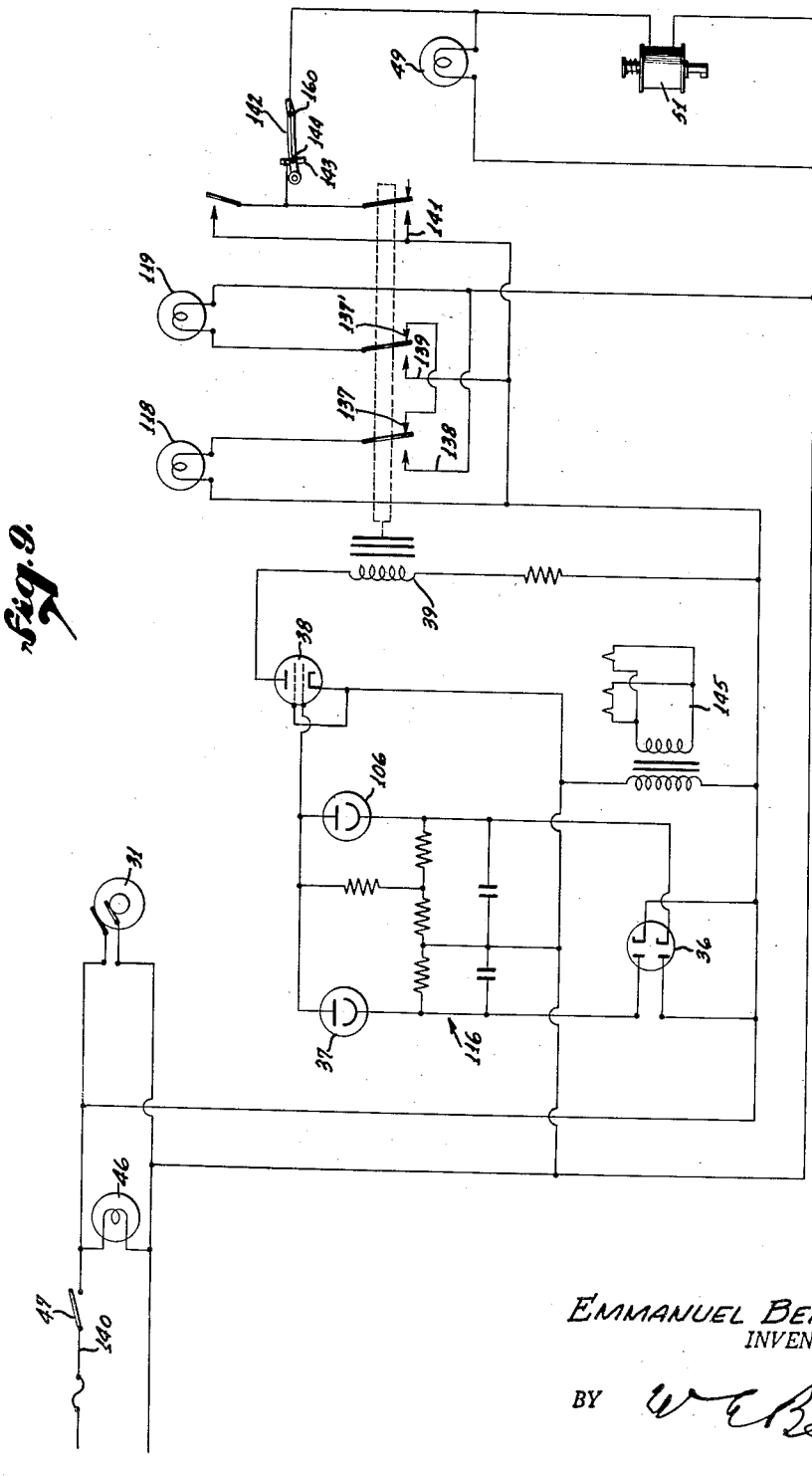
EMMANUEL BERLANT,
INVENTOR.
BY
ATTORNEY.

Patented Dec. 11, 1951

2,578,037

UNITED STATES PATENT OFFICE 2,578,037

MICROFILM CAMERA

Emmanuel Berlant, Culver City, Calif., assignor to Berlant Associates, Los Angeles, Calif., a partnership Application May 17, 1947, Serial No. 748,735

3 Claims. (Cl. 88—24)

The invention relates to a micro-film camera, and more particularly to a continuous flow camera for copying or photographing a master such as documents or the like onto film. The master is photographed in reduced size on the film, the ratio of reduction being the same as the speed ratio of the master and the film. Micro-film cameras of this general type are well-known and have a number of defects which are overcome by the improvements constituting the present invention.

With the prior type of micro-film camera, use has been made of a clutch between the motor and the drum which carries the master, with a finger riding on the drum in the path of the master so as to operate the clutch and drive the film through the camera when the master is on the drum in a position to be photographed. This has the disadvantage that if the master is tissue or very thin paper, the drum finger may tear it or serve to catch a portion of the paper and prevent it from lying smooth on the drum. This disadvantage is overcome by the present invention which has for an object to control the clutch without mechanical contact with the master. This is accomplished by providing a light sensitive device to control the clutch, the light sensitive device having a light path which is intercepted by the master. Preferably this control is in the form of a bridge circuit having light sensitive cells in two arms of the bridge, the current from the cells being balanced when the master is absent and unbalanced when the master is in position to be photographed, this balance and unbalance controlling a relay which operates the clutch. Preferably both photo-cells are energized from the same lamp or lamps employed for illuminating the master.

Concerning another feature of the invention, lenses of commercial quality have a plus or minus 2% tolerance as to their focal length. It is necessary that the ratio of the front and back focal lengths of the camera lens, i. e., objective lens, should be the same as the speed ratio of the master and the negative film in the camera. While some means have been used heretofore to equalize these two ratios, they are somewhat complicated and it is a further object of the present invention to provide a simpler means for this purpose. This is accomplished by permitting the position of the objective lens to remain fixed, while providing a simple means to adjust each of the front and back focal lengths.

A further object of the invention is to provide an improved film magazine having the film supply and take-up elements and a driving sprocket and with a drive element readily coupled to or uncoupled from the motor drive by inserting the magazine into or removing it from its casing. Preferably the casing has a stop to fix the back focal length, and this stop being adjustable so that in the course of manufacturing and testing the camera, the necessary adjustment can be made in the back focal length to accommodate a particular objective lens.

A further object is to provide a number of signal lamps showing the proper functioning of the camera and its associated parts, and one of these lamps may serve to show that the supply reel is empty, this condition also operating the clutch to stop the camera.

It will be apparent that the invention provides a compact device which is simple to operate, as well as a number of other features and improvements as set forth in the specification and claims.

For further details of the invention, reference may be made to the drawings wherein Fig. 1 is a vertical sectional view of a micro-film camera according to the present invention.

Fig. 3 is a sectional view taken on line 3—3 of Fig. 2 looking in the direction of the arrows.

Fig. 4 is a sectional view on line 4—4 of Fig. 2 looking in the direction of the arrows, parts being broken away.

Fig. 5 is a front view in elevation as seen on line 5—5 of Fig. 4 looking in the direction of the arrows.

Figs. 6 and 7 are enlarged sectional views on lines of the corresponding numbers in Fig. 1 looking in the direction of the arrows.

Fig. 8 is a front view in elevation.

Fig. 9 is a diagram of the circuit for controlling the electrical apparatus of micro-film camera.

Figure 1:
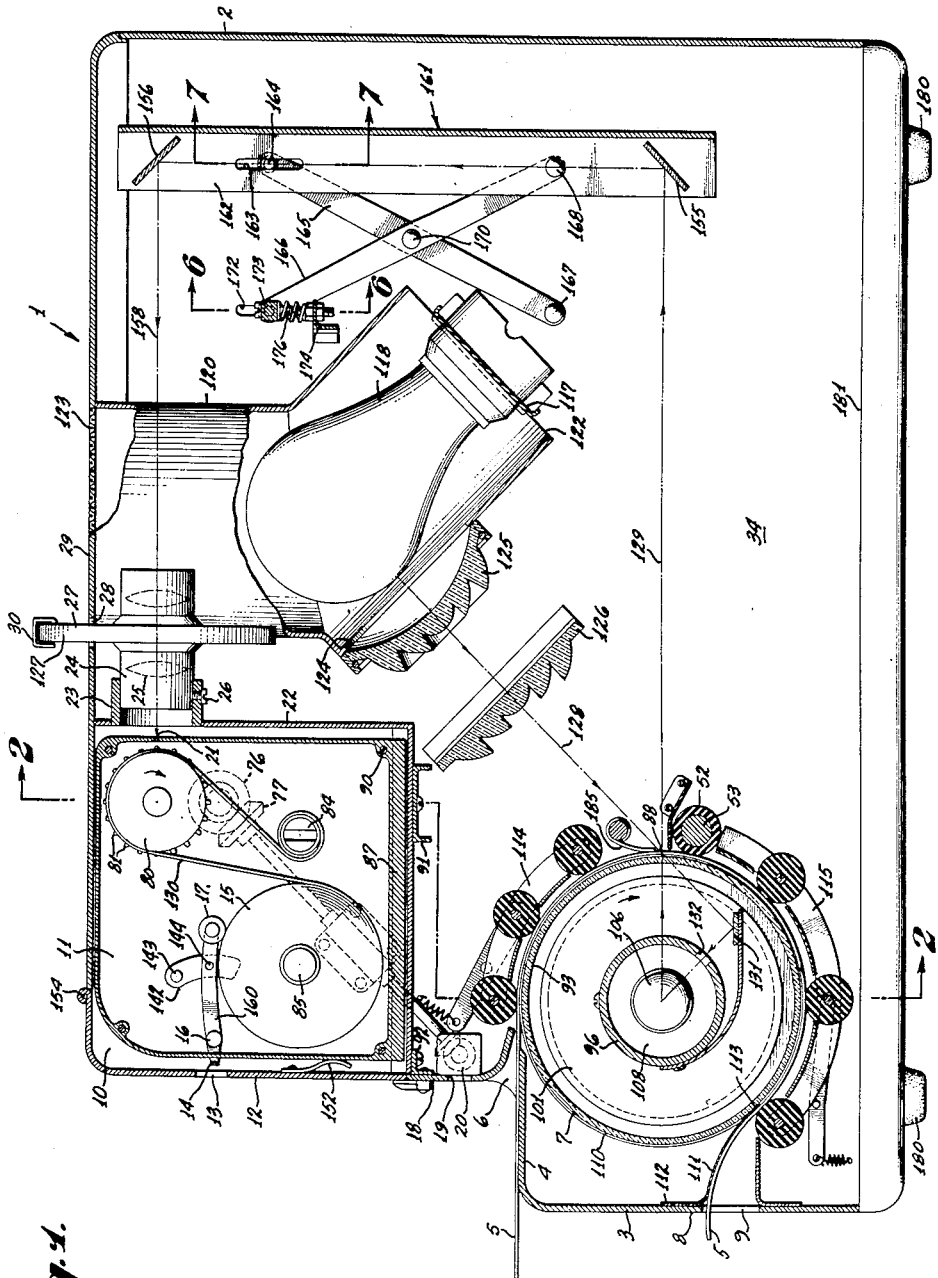

Referring in detail to the drawings, as shown in Figs. 1 and 8, the micro-film camera 1 comprises a main casing 2 having a protruding lower front portion 3 having a top wall 4 to serve as a shelf to guide the master 5, such as a paper document or the like, into an elongated inlet slot 6, to feed the master to the master drum 7. The front 3 has an upright wall 8 having a discharge outlet 9 for the master.

Above the master drum 7, at the front of the main casing 2 is a compartment 10 in which the film magazine 11 removable fits. Access is had to the film magazine 11 by opening a door 12 at the front of the compartment 10.

The door 12 has a window 13 for an indicator 14 to show how much, if any, film remains on the supply spool 15. The indicator 14 is at the front end of a follower lever 160 pivoted as indicated at 16. The other end of the follower lever 160 has a roller 17 which rides on the supply spool 15.

Between the lower end of door 12 and the inlet 6, the front wall portion 18 of the main casing is provided with a window 19 for inspecting a footage counter 20 which may be calibrated in terms of the number of sprocket holes in the film passing the recording slit 21 at the rear of the magazine 11.

The rear wall 22 of compartment 10 has a sleeve 23 in which fits the lens tube 24 of a suitable objective lens schematically indicated at 25. The lens tube 24 is held in sleeve 23 by a screw 26. Lens 25 has a diaphragm 27 having an adjusting ring 127 which extends through an opening 28 in the top cover 29, being provided with a pointer indicated at 30 for calibrations in terms of the stop opening as usual.

Figure 2:
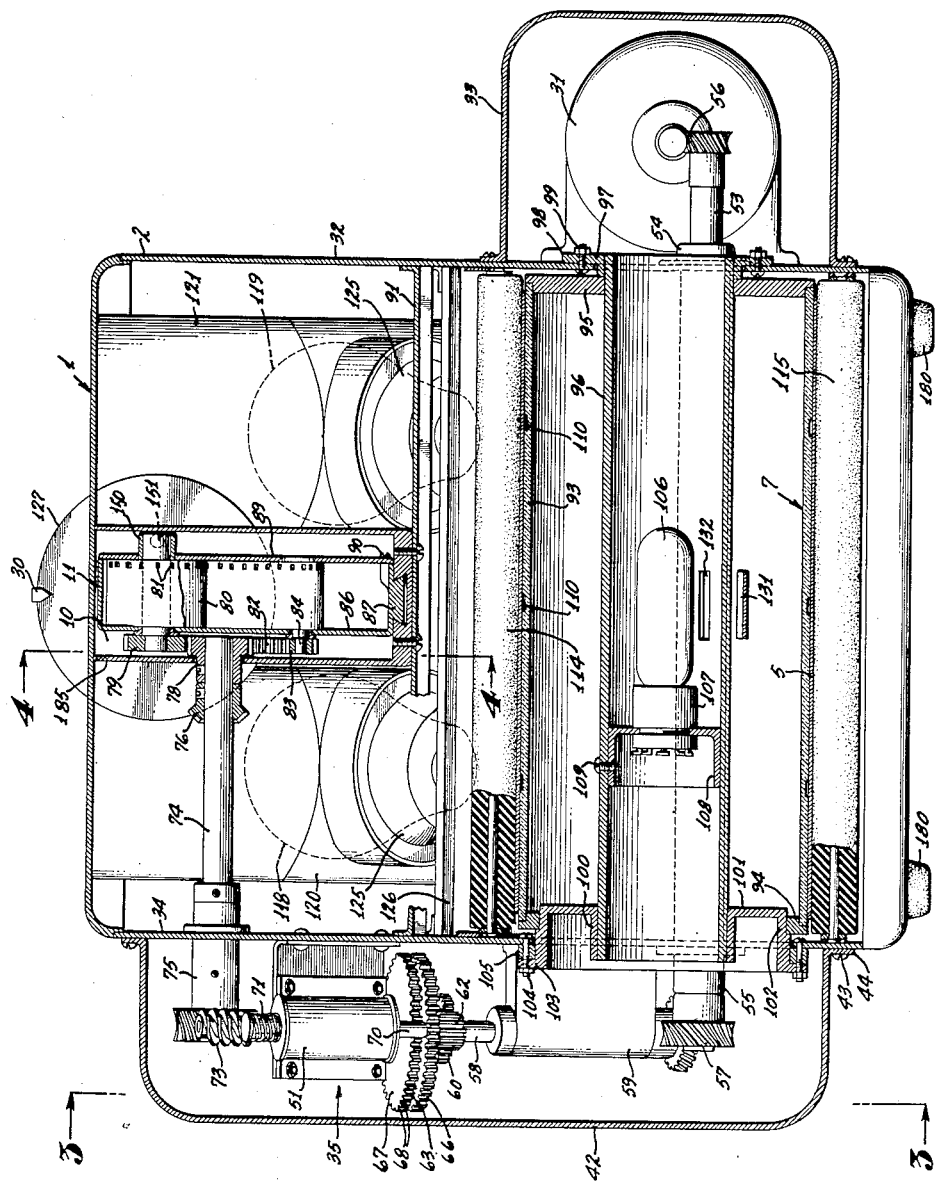
Fig. 2 is a sectional view on the broken line 2—2 of Fig. 1 looking in the direction of the arrows.

As shown in Fig. 2, the motor 31 is arranged outside of the side wall 32 of the main casing 2, and provided with a cover 33.

Outside of the other side wall 34 of the main casing 2 is arranged a clutch 35 as well as the vacuum tubes 36, 37, 38, and relay 39 of the circuit shown in Fig. 9. The tubes 36, 37, and 38 are supported on the upper portion and relay 39 on the lower portion of an U channel 40 serving as a double shelf suitably secured to the side wall 34 by bolts or rivets such as indicated at 41. The clutch 35 and its associated power drive elements later described, and the tubes 36 to 38 and relay 39 are enclosed in a removable cover 42 held in place by screws or bolts as indicated at 43, around its rim 44, as shown in Figs. 2 and 3.

As shown in Fig. 8, at each side of the door 12 is a panel, suitably supported on the front wall 18 of the main casing 2, one of these panels being indicated at 45 having a green lamp 46 and a main line switch 47, the other panel 48 having a red lamp 49 and a switch 50 to momentarily operate the solenoid 51, see Fig. 3, of the clutch 35, to bring unexposed film in front of recording slot 21 at the start.

The above will give a general idea of the arrangement and operation of the parts which will now be described in further detail.

*Power drive.*—The master drum 7 is driven by a rubber or friction roll 52 on a shaft 53 arranged behind the drum 7 as shown in Fig. 1, shaft 53 extending beyond the opposite side walls 34 and 32 as shown in Fig. 2. Shaft 53 is supported in suitable bearings indicated at 54 and 55. One end of shaft 53 is coupled through gears 56 to motor 31. The other end of shaft 53 is coupled through gears 57, see also Fig. 3, to a shaft 58 supported in a bearing 59 on the outside of wall 34. Shaft 58 at its upper end has a gear 60 in mesh with two planetary gears 61 and 62 mounted on a disk 63 loosely mounted on shaft 64. Fixed to shaft 64 is a gear 65 also in mesh with the planetary gears 61 and 62. Disk 63 has notches 66 in its periphery and shaft 64 has a disk 67 of the same diameter fixed thereon and having similar notches 68 in its periphery. The notches 66 or 68 are engaged by a detent 69 on the plunger 70 of solenoid 51. Plunger 70 is held up by spring 71 when solenoid 51 is de-energized, with detent 69 engaging a notch 68 to hold shaft 64 stationary and prevent the feeding of film in magazine 11. At this time, if the motor is running, shaft 58 rotates and disk 63 rotates around shaft 64 without rotating shaft 64. When solenoid 51 is energized, detent 69 moves to release notch 68 and engage one of the notches 66 whereby shaft 58 drives shaft 64 through the gears 60, 61, 62 and 65. Shaft 64 is supported by a bearing 72 on the outside of wall 34 and at its upper end is coupled through a worm gear 73 to shaft 74, see Fig. 2. Shaft 74 is mounted in a bearing 75 on the side wall 34. Intermediate the ends of shaft 74 is bevel gear 76, see also Fig. 5, coupled with other gears indicated at 77 and 78', to the film counter 20. The inner end of shaft 74 projects through the side wall 185 of the magazine compartment 10 where it has a spur gear 78, in position to be engaged on one side thereof by the spur gear 79 on the copy drum 80 which also has sprocket teeth 81 to drive the film, and on the other side thereof by an idler gear 82 meshing with gear 83 on the take-up spindle 84, see Figs. 1, 2 and 4. The take-up spindle 84 and the supply spindle 85 are rotatably mounted in the side walls of the magazine 11 and the gears 79, 82 and 83 are carried by the magazine 11 on its outside wall 86. The gears 79 and 82 on the magazine 11 are engageable with or disengageable from the driven gear 78 in the compartment 10, by simply pushing magazine 11 into or pulling it out from compartment 10. To guide such movement of magazine 11 it may have a dovetail slide connection 87 with the bottom of compartment 10. The speed ratio of the copy drum 80 and the master drum 7 is the same as the ratio of the back and front focal lengths of lens 25 and this ratio is also the same as the ratio of the width of recording slit 21 to the exposure slit 88 at drum 7; all of such ratios for example may be 20 to 1.

*Film magazine.*—The film magazine 11 can be loaded or unloaded by removing its side wall 89 which is held in place by screws 90, see Figs. 1 and 2. The compartment 10 is braced by a cross piece 91 suitably fastened to the opposite walls 32 and 34 and is also supported by a corner brace 92 shown in Figs. 1 and 4.

*Master drum.*—The master drum 7 comprises a cylinder 93 of glass, plastic or other translucent material, secured to end rings 94 and 95. End ring 95 is rotatably carried by a metal tube 96 coaxial with the cylinder 93. Tube 96 is removably supported at its right end as shown in Fig. 2 in a ring 97 having a flange 98 at the outside wall 32 and to which it is removably secured by means such as bolts 99. Tube 96 at its other end is welded or otherwise secured to flange 100 on a ring 101 having a cylindrical bearing 102 rotatably supporting the ring 94 on the drum 7. Ring 101 has an outer flange 103 removably secured by means such as bolts 104 to a ring 105 and to the outside of the wall 34. Ring 101 and tube 96 can be withdrawn to the left, from casing 2 when bolts 104 are removed as the right end of tube 96 will slide out of ring 97 and as the opening in ring 105 is of larger diameter than the recessed bearing 102. The purpose of thus removing tube 96 is to gain access to the photoelectric cell 106 inside of tube 96, when it is necessary to replace cell 106. When tube 96 is to be replaced in position, its right end can be guided through ring 95 by supporting the cylinder 93 in proper position by hand, access being had to the cylinder 93 through the bottom of casing 2 which is open. Cell 106 is supported in a usual socket 107 mounted on a cup-shaped support 108 removably fitting inside of tube 96 and held in place by screws such as 109. The cylinder 93 has a plurality of peripheral grooves such as indicated at 110 in Fig. 2, three being shown, and for each groove there is a spring stripping finger 111 as shown in Fig. 1, one end of the stripper being secured to the inside of wall 8 as indicated at 112, and its other end resiliently riding in a groove as indicated at 113, to strip off the master 5 and guide it to the outlet 9. The master 5 is held on the cylinder 93 by suitable pressure rollers or pad rollers indicated at 114 and 115 in Fig. 1, and also by a pressure plate 185 having a spring not shown. Plate 185 forms the lagging edge of slit 88.

*Clutch control.*—The photo-cell 106 which is inside of tube 96, as shown in Figs. 1 and 2, and the photo-cell 37 which is outside of wall 34 as shown in Fig. 3, are connected in a bridge circuit 116, as shown in Fig. 9. These photo-cells are illuminated and balanced as follows: Inside of casing 2 is an inclined shelf 117 supporting two foto-flood lamps 118 and 119 each mounted in a chimney 120 and 121 respectively. Each chimney like 120 opens at its bottom as indicated at 122 in Fig. 1 and has a screen 123 over its top at the top of the casing 2, to ventilate the lamps. Each chimney has a circular opening like 124 over which is suitably supported a spherical Fresnel lens 125. The two lenses like 125 illuminate a rectilinear cylindrical Fresnel lens 126 to uniformly illuminate the elongated slit 88 which extends the length of the cylinder 93. The lamps 118 and 119 and their lenses 125 and 126 have optical axes as indicated at 128 in a plane which is inclined to the optical axis plane 129 along which light is reflected from the master material at slit 88 to the film 130 in magazine 11. On the optical axis plane 128, inside of cylinder 93 and outside of tube 96 is an inclined mirror 131 which reflects radiation, which may or may not be visible rays, from lamps 118 and 119 through opening 132 in tube 96 to cell 106, assuming there is no paper or other master material 5 on the drum 7. Light or other radiation from lamp 118 passes through an opening 133, see Fig. 3 in wall 34, to excite cell 37. The amount of light passing through opening 133 is adjusted by suitable shutters 134 and 135 held in adjusted position by means such as screws like 136. The shutters 134 and 135 are adjusted to balance the cells 37 and 106 which are in opposite arms of bridge 116. Bridge 116 is energized by current from a double rectifier 36. Cells 37 and 106 remained balanced when there is no master material on drum 7, regardless of whether the light intensity of lamps 118 and 119 is high or low and regardless of fluctuations in the lamp intensity due to fluctuations in the line voltage, as both cells are excited by the same radiant source. When master material such as a sheet of paper, regardless of whether the paper is opaque or whether it is translucent, is fed to the drum 7, when the leading edge of such material arrives at slit 88, it upsets the balance between the cells 37 and 106, thereby putting a potential on the input circuit of tube 38 which may be a thyratron amplifier, to operate relay 39. Before relay 39 operates, with the main line switch 47 closed, lamps 118 and 119 are illuminated at low intensity as they are connected in series through the back contacts 137, 137' of relay 39, over an obvious circuit as shown in Fig. 9. When relay 39 operates, lamps 118 and 119 are illuminated at normal intensity as they are connected in parallel over the front contacts 138 and 139 to the line 140. Also solenoid 51 is now connected to line 140 through the front contact 141 of relay 39, assuming that switch 142 is closed. Switch 142 is a magazine safety switch which is closed so long as there is film on the supply reel 15. Switch 142 has a contact 143 on the inner side of wall 86 which is broken by a contact 144 on follower 160 when follower 160 drops to a position where all of the film 130 has been fed off of the film supply 15. When solenoid 51 is energized as above described, it operates clutch 35 to connect drive sprocket 80 to motor 31, to drive the film 130. Red lamp 49 is connected across solenoid 51 and is illuminated when solenoid 51 is actuated and is extinguished when solenoid is not energized. As solenoid 51 operates the clutch 35 to drive the film 130, when lamp 49 is on, it indicates that the film 130 is being propelled, and as solenoid 51 is energized only when bridge 116 is upset due to the presence of a master on drum 7, when lamp 49 is lit it shows that the micro-film camera 1 is in operation, printing or photographing on to film 130 subject matter from master 5. Assuming there is sufficient amount of film 130 on the supply reel 15, lamp 49 is extinguished when the trailing edge of the master 5 passes the slit 88, thereby restoring the balance of the bridge 116, to de-energize relay 39. Whether the trailing edge of master 5 has passed slit 88 or not, if the film supply 15 has been exhausted, switch 142 will operate to extinguish lamp 49. In this event, the particular master 5 would have to be photographed again after magazine 11 had been loaded with fresh film. The tubes 36 to 38 are R. C. A. tubes and the type numbers are as follows: 36 is No. 6H6; 37 and 106 are No. 929; 38 is No. 2050. The filament circuit for the indirectly heated cathodes of tubes 36 and 38 is indicated at 145 in Fig. 9 and the values of the resistances and condensers in bridge circuit 116 are indicated on Fig. 9, the condenser values being in m. f. The green light 46 is on while the main switch 47 is closed, motor 31 operating and lamps 118 and 119 being connected in series, with camera magazine 11 idle, until master 5 is fed to drum 7. Switch 50 is normally open and may be manually closed at the start to wind up the leader of exposed end of film 130 so as to bring fresh film in front of the printing slit 21. Closing switch 50 energizes solenoid 51 over an obvious circuit and lights the pilot lamp 49 at the same time.

*Adjustable back focus.*—At the time the apparatus is manufactured and tested, as above described, it is necessary to compensate for the fact that different objectives 25 have different focal lengths. This is taken into account by providing a simple arrangement for adjusting both the front and the back focal lengths. The back focal length is adjusted by providing an adjustable stop 146, see Fig. 4, to limit the insertion of magazine 11 into its compartment 10, by the amount necessary to bring the film 130 behind slit 21 in focus. As shown in Fig. 4, the stop 146 may comprise a bolt 147 extending into the rear wall 22 of compartment 10, the bolt having two lock nuts 148 and 149 on opposite sides of wall 22. As shown in Fig. 2, the wall 89 of magazine 11 has a sleeve 150 which engages the inner end 151 of bolt 147 to limit the insertion of magazine 11 to the proper amount. The magazine 11 is held in its innermost position against the bolt end 151, by means of a spring 152 on the inner side of door 12. A suitable latch 153 holds the door 12 closed. Door 12 has a hinge as indicated at 154 on the top cover 29.

*Adjustable front focal length and image direction.*—The recording sprocket 80 and the master drum 7 both rotate in the same direction, that is clockwise as seen in Fig. 1. Assuming the top of a letter or the like is inserted in the inlet 6, the reading matter will appear upside down at slit 88. This image is inverted by the two mirrors 155 and 156 so that the image is erect on leaving mirror 156 and is again inverted by lens 25 so that the image travels in the same direction as film 130 behind slit 21. The mirrors 155 and 156 are spaced apart the same distance as the axes of drums 7 and 89, and those mirrors are set at forty-five degrees facing each other so that the optical axis 129 from slit 88 to mirror 155 is substantially parallel to the optical axis 158 from mirror 156 to slit 21. Mirror 155 is about as long as slit 88 whereas mirror 156 is somewhat shorter. These mirrors 155 and 156 are suitably mounted on a bracket 161 having similar side flanges, one of which is shown at 162 in Fig. 1. Flange 162 has a vertical slot 163 in which rides a pin 164 on the upper end of a lever arm 165 pivoted at its central portion as indicated at 170 to a similar lever 166. The lower end of lever 165 is pivotally connected to the wall 34 as indicated at 167 while the lower end of lever 166 is pivotally connected to the flange 162 as indicated at 168. The levers 165 and 166 comprise a parallel link motion or lazy tong, the upper end of lever 166 as shown in Fig. 6 having a bearing support on a pin 171 which rides in a vertical slot 172 in the side wall 34. Slot 172 is enclosed by the cover as shown in Fig. 3, while bracket 162 is housed in the casing 2. Pin 171 is at the end of a rod 173, the other end of rod 173 having pin like 171 forming an axle for the upper end of the lever like 166. A slot not shown, like 172, is provided inside the other side wall. Between the side walls, one of which is indicated at 34 in Fig. 6 is a shelf 174 having soldered thereto a nut 175 for a bolt 176 rotatably mounted in the central portion of rod 173 as indicated at 177. A compression spring 178 on the bolt 176 maintains the rod 173 against the head of bolt 176 which may be threaded into or out of nut 175 to raise or lower the upper ends of levers like 166 and move bracket 161 and the mirrors 155 and 156 carried thereby, to the right or left, as seen in Fig. 1, to vary the focal length from slit 88 to the objective 25. After this adjustment is made, bolt 176 may be locked into position by a lock nut 179.

*Lamp ventilation.*—The casing 2 may have feet as indicated at 180 in Fig. 1 to support casing 2 with its open bottom 181 above the level horizontal support on which the micro-film camera 1 rests, whereby a current of air may enter the open bottom 181 and ventilate the lamps 118 and 119 through their chimneys 120 and 121.

*Operation.*—While the operation will be apparent from the above description, it may be summarized in general as comprising the following steps: (1) Insert a loaded magazine 11 in its compartment 10; (2) Close main line switch 47 and wait about twenty seconds for the tube filaments in circuit 145 and the flood lamps 118 and 119 to heat up; (3) Close switch 50 to expel exposed film; (4) Insert the paper or master 5 to be microfilmed; (5) At the close of the day or at the end of the operation, open main line switch 47.

The invention provides safeguards through the provision of the signal lamps referred to above and through preventing the operation of the machine unless the following conditions are fulfilled, namely, the film magazine in place, the film magazine loaded with fresh film, and both projection lamps functioning. These safeguards make it impossible to operate the camera unless it is functioning properly.

*General.*—While the invention has been described as a micro-film camera, it may also be described as a projection printer. Various features of the invention may be used with other types of cameras or with other types of continuous projection printers. Various modifications may be made in the invention without departing from the spirit of the following claims.

I claim:

1. A micro-film camera having a film feeding means, a motor for driving said means, and an electrically controlled clutch between said motor and means, positioning means for copy material, a photosensitive device adjacent said positioning means, a source of light for energizing said device, said device being arranged to control operation of said clutch and being so positioned that copy material on said positioning means will intercept light from said source whereby said device will operate said clutch to establish a driving connection between said motor and film feeding means, said source of light being also arranged to illuminate said copy material when on said positioning means and a film supply means for said camera, a film actuated switch, a signal light, said signal light being arranged in a circuit under the control of both said photosensitive means and said film actuated switch whereby said light is energized when copy material is on said positioning means and film is in said supply means but extinguished in the absence of film from said supply means or of copy material from said positioning means.

2. A micro-film camera having a film feeding means, a motor for driving said means, and an electrically controlled clutch between said motor and means, positioning means for copy material, a photosensitive device adjacent said positioning means, a source of light for energizing said device, said device being arranged to control operation of said clutch and being so positioned that copy material on said positioning means will intercept light from said source whereby said device will operate said clutch to establish a driving connection between said motor and film feeding means, said source of light being also arranged to illuminate said copy material when on said positioning means, said positioning means being a translucent cylinder about which said copy material is guided, said photosensitive device being positioned within said cylinder.

3. A micro-film camera comprising, a rotatable drum for supporting and moving copy material, a shaft parallel to said drum, a friction roller on said shaft and engaging the periphery of said drum whereby to drive said drum in rotation and hold copy material thereagainst, a camera arranged to photograph copy material on said drum, said camera including a movable film support, motor means connected to one end of said shaft, and disconnectable drive means extending from the other end of said shaft to said movable film support, detecting means for detecting the presence or absence of copy material on said drum and operable, in the absence of such material, to disconnect said driving means between the said other end of said shaft and the said movable film support, said detecting means comprises a photosensitive element, a light source arranged to illuminate copy material on said drum, said photosensitive element being arranged to receive light from said source and thereby operate to disconnect said driving means, the arrangement being such that copy material on said drum will intercept light directed from said source toward said photosensitive element, said drum comprising a hollow cylinder of light-transmitting material, said photosensitive element being positioned in said cylinder.

EMMANUEL BERLANT.

REFERENCES CITED

The following references are of record in the file of this patent:

UNITED STATES PATENTS

| Number | Name | Date |
|---|---|---|
| 1,344,896 | Jobke | June 29, 1920 |
| 1,745,956 | Schlesinger | Feb. 4, 1930 |
| 1,897,903 | Hopkins | Feb. 14, 1933 |
| 1,900,878 | Hopkins | Mar. 7, 1933 |
| 1,957,889 | Hopkins | May 8, 1934 |
| 2,099,681 | Draeger | Nov. 23, 1937 |
| 2,100,967 | Levy | Nov. 30, 1937 |
| 2,107,074 | Hineline | Feb. 1, 1938 |
| 2,177,135 | Fassel | Oct. 24, 1939 |
| 2,194,808 | Pooley | Mar. 26, 1940 |
| 2,219,458 | Sohns | Oct. 29, 1940 |
| 2,234,717 | Altman | Mar. 11, 1941 |
| 2,248,627 | Holbrook | July 8, 1941 |
| 2,291,006 | Stuart | July 28, 1942 |
| 2,328,847 | Place | Sept. 7, 1943 |
| 2,342,509 | Gaty | Feb. 22, 1944 |
| 2,391,497 | Wilson | Dec. 25, 1945 |
| 2,411,694 | Place | Nov. 26, 1946 |
| 2,439,055 | Pratt | Apr. 6, 1948 |
| 2,478,980 | Pratt | Aug. 16, 1949 |
| 2,481,694 | Schubert | Sept. 13, 1949 |